Jan. 22, 1963  O. P. LANCE ET AL  3,074,536
CONVEYOR

Filed March 21, 1960  2 Sheets-Sheet 1

INVENTORS
O. P. LANCE
A. B. SKROMME

ATTORNEYS

Jan. 22, 1963    O. P. LANCE ET AL    3,074,536
CONVEYOR
Filed March 21, 1960    2 Sheets-Sheet 2
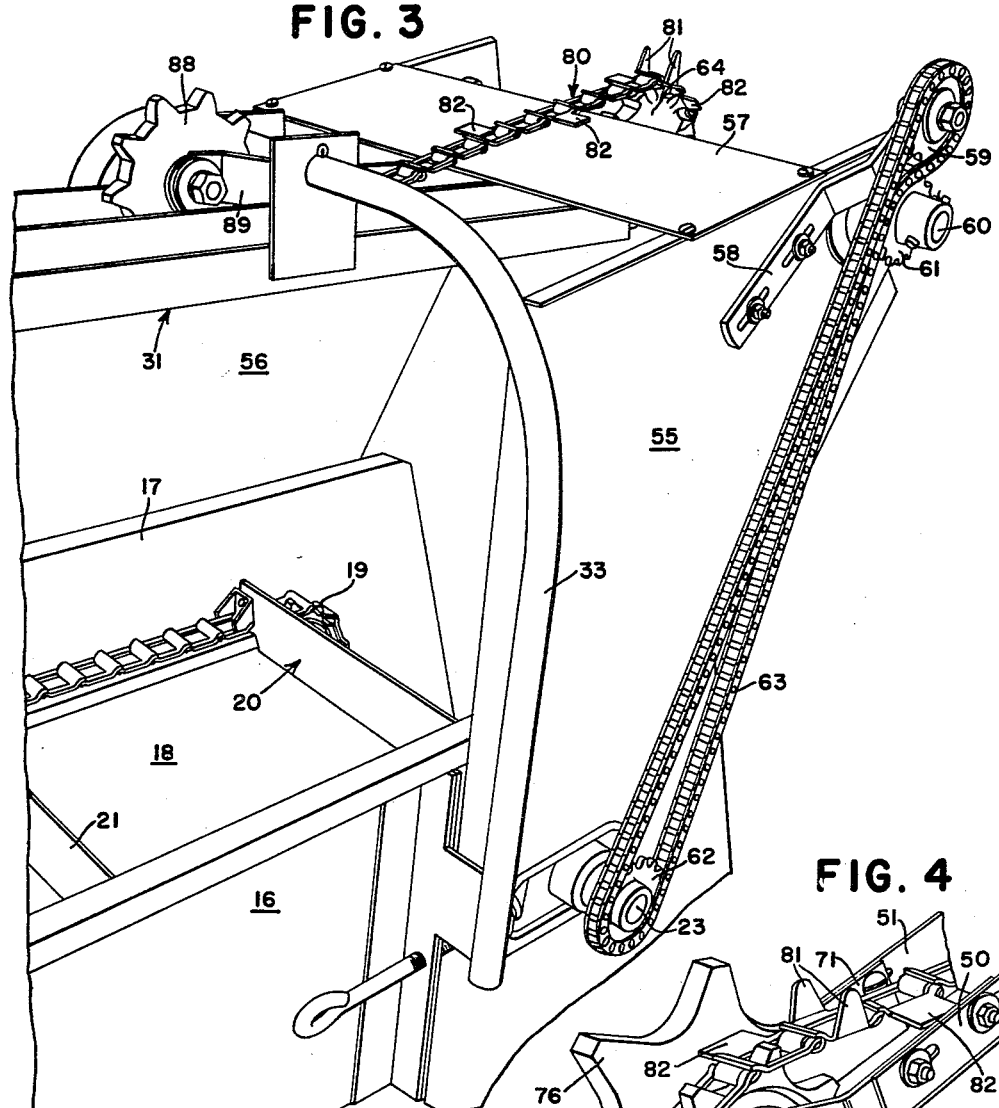
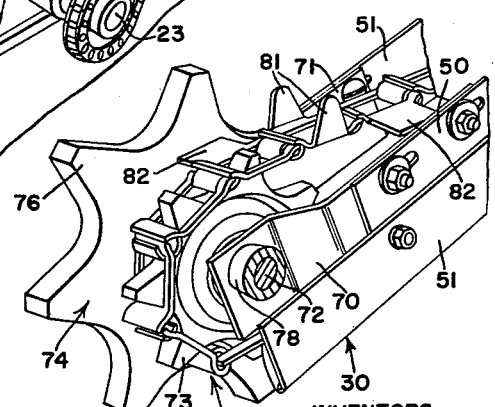
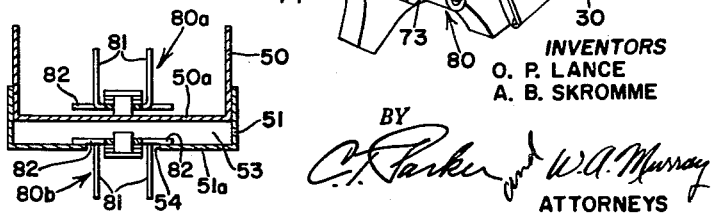
INVENTORS
O. P. LANCE
A. B. SKROMME
BY
C. F. Parker and W. A. Murray
ATTORNEYS

3,074,536
CONVEYOR

Orville P. Lance and Arnold B. Skromme, Moline, Ill., assignors to Deere & Company, Moline, Ill., a corporation of Delaware
Filed Mar. 21, 1960, Ser. No. 16,317
1 Claim. (Cl. 198—204)

This invention relates to an article-handling machine and more particularly to a conveying apparatus for elevating articles such as bales of hay or straw from the ground to a higher level. More specifically, the invention relates to means for use on a bale loader or elevator for preventing retrograde movement of the bales as they are being elevated.

Bales of hay or straw as formed by conventional balers may be either cylindrical or of elongated block form. In either case, the length of such bale materially exceeds its width by about two to one. As any farmer will readily attest, a bale is one of the most difficult articles to handle, because it is fairly heavy, bulky and at times annoyingly unwieldy.

Baled hay or straw, like the same material in bulk, is customarily stored in quantity in lofts, and various devices have been used or proposed for accomplishing the elevation of the material from the ground to such lofts. More recently, the conventional grain elevator has been used for this purpose, it being found that the usual elevator, particularly one of the larger sizes, has sufficient capacity to elevate the bales. A conventional elevator of the type referred to comprises an elongated trough or ramp inclining from a lower receiving end to an upper discharge end. An endless conveyor runs in the trough for moving material from the receiving end to the discharge end. These elevators operate efficiently in the handling of corn or grain, which is relatively fluent, and it is ordinarily immaterial at what angle of elevation these machines operate. However, in the elevation of bales of hay or straw, different problems arise. The most serious problem is the tendency of the bales, when the elevator is operated at an extreme angle, to roll end over end down the elevator. The bales are loaded into the elevator so that their length lines along the length of the trough and, since the flights on the endless conveyor are designed primarily for grain, the bales are rather precariously held in the trough. Accordingly, it is expedient to provide some form of means running above the elevator for holding the bales downwardly against the endless conveyor so that they cannot roll or turn end over end down the trough.

In U. S. Patent No. 3,036,688 there is described and shown a longitudinal guide above the conveyor trough of the elevator which contacts the upper side of the bales and prevents their tumbling down or over the side of the elevator. There is further provided on the guide a longitudinally running continuous chain with one run above the guide and one below the guide. The chain has lugs thereon which contact the tops of the bales and aid in moving the bales.

The present structure is an improvement in the type of conveyor set forth and described in the above patent although the principles herein to be described may be readily adapted for use in other types of conveyors.

In any type of overhead guide or conveyor in which a chain is used, as for example, the type of mechanism described above, the lower run of the chain will hang in catenary fashion between its drive sprockets. The longer the run is, the more pronounced this condition exists. Also, as a chain becomes worn, the chain will lose its tautness between the sprockets. This, of course, creates a problem of the chain tending to yield away from the line of conveyance. For example, in the above described type of conveyor and guide, the chain will tend to sway to one side of the bale or will in some instances turn completely over. In either case, abnormal wear results on the chain links and the chain operates in an inefficient manner relative to its function of conveying.

With the above in mind, it is the pupose and one object of the present invention to provide an improvement in a chain conveyor which will eliminate the above-described problems. Specifically, it is proposed to provide a chain conveyor with links having both vertically and laterally extending lugs which operate in combination with an overhead guide or other type lateral plate having means thereon overlying the lateral lugs for the purpose of preventing lateral and vertical sway of the chain relative to the guide.

More specifically it is proposed to provide an improvement for use on a bale conveyor having a longitudinal trough with advancing means thereon comprising an overhead guide composed of vertically spaced lateral plates with the lower of the plates having a longitudinal slot therein. A continuous chain is supported between opposite ends of the giude with the links of the chain having laterally extending and vertically extending lugs. The lateral lugs of the lower run are disposed between the plates and the vertical lugs depend through the slot and contact the upper surface of the bales.

Other objects and advantages of the present invention will become apparent to those skilled in the art as the nature of the invention is better understood from the disclosure herein set forth and as shown in the accompanying drawings.

FIG. 3 is a side and forward perspective view of the upper end of the elevator.

FIG. 4 is a view somewhat similar to FIG. 2 with portions removed to show internal mechanism.

FIG. 5 is a sectional view taken substantially along the line 5—5 of FIG. 1.

As stated above, the principles of the invention are equally applicable whether the arrangement embodying the same is utilized as an attachment for existing elevators or as part of a specially designed machine for handling bales. Accordingly, the present disclosure is to be taken as representative only and not as supporting the importation of limitations on the scope of the invention. Further, the use of such expressions as "bottom," "top," "length," "width," etc., is for convenience only, due regard being had to the various equivalent possibilities that will readily occur from the disclosures.

Figure 1:
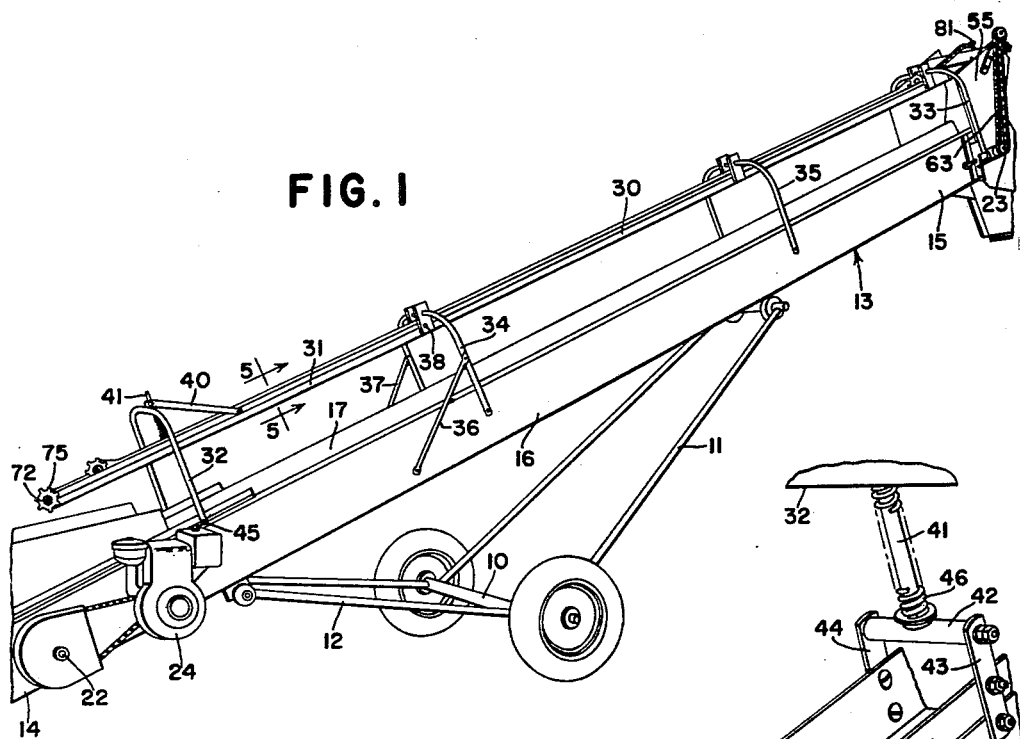
FIG. 1 is a side perspective of an elevator incorporating the structure of the present invention.
Figure 2:
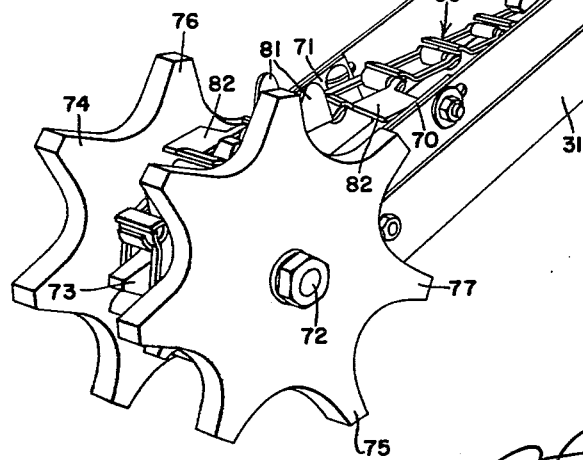
FIG. 2 is a side and forward perspective of the lower end of the guide and chain mechanism.

FIG. 1 best shows the over-all picture. The elevator chosen for the purposes of illustration comprises a transverse wheeled axle 10 with a derrick 11 and a reach 12. Trough or ramp means 13 is supported on the derrick and reach and incline from a lower bale-receiving end 14 to an upper bale-discharge end 15.

The upper portion of the trough or ramp means 13 comprises a pair of transversely spaced apart, elongated parallel sides 16 and 17 cross-connected by a floor 18 which provides an upper surface for the ramp and over which moves the upper run of an endless conveyor 20. This conveyor may be of any conventional construction, such as one that includes a pair of transversely spaced apart chains (one of which is clearly visible in FIG. 3) mounted over sprockets, such as at 19, and cross-connected by a plurality of flights or slats 21. Shafts 22 and 23 respectively at the receiving and discharge ends 14 and 15 of the trough carry the conveyor. The conveyor may be driven in any suitable manner. In the present case, an internal combustion engine 24 is indicated as the source of power.

The improvement lies generally in the provision of an improved guide mechanism above the trough 17. The guide, comprises a rear or first rigid elongated section 30 and a forward or second rigid elongated section 31. The guide extends between a forward U-shaped support 32 at the bale-receiving end of the elevator and a rear U-shaped support 33 at the rear or bale-discharge end of the elevator. Intermediate the supports 32, 33 is a pair of intermediate supports 34, 35. Opposite legs of the U-shaped members 32–35 depend on opposite sides of and are connected to the side walls 16, 17 of the elevator trough 13. The bight portions of the U-shaped supports 32–35 overlie the trough and serve as direct support for the sections 30, 31. The rear or first section 30 is held generally against fore-and-aft movement by means of struts 36, 37 which extend between the legs of the U-shaped member 34 and the side walls 16, 17 respectively. The forward section 31 is pivoted about a pivot point or pin 38 at its rear end and is therefore pivoted relative to the rear section 30. The forward section 31 of the guide extends or projects forwardly from the front support 32 and is pivotally connected to the support 32 by means of a link 40 pivoted at opposite ends to the guide section 31 and bight portion of the U-shaped member 32. Extending downwardly from the bight portion is a shaft 41 which is fixed to a transverse pivot pin 42 pivoted at opposite ends to a pair of brackets 43, 44 fixed to opposite sides of the guide section 31. The U-shaped support 32 is pivoted as at 45, to swing fore and aft relative to the trough on the side walls 16, 17 and consequently, through the pivots 45, and the pivotal connection of the link 40 to the guide section 31 and support 32, the section 31 is free to move vertically about its rear end or pivot 38. A spring surrounds the rod 41 and normally biases the guide section 31 to a height substantially the width of a bale from the floor 18 in the trough 13. The purpose of supporting the forward section 31 in the manner described is to permit some vertical flexibility at the forward end of the guide section. Should a bale be dumped from a wagon and started in the elevator in a standing position, the forward end of the guide would compress the spring 46 to permit the bale to enter the trough until it may be tumbled to its side.

The guide section 31 is composed of a pair of rigid elongated U-shaped members 50, 51 opening upwardly and having laterally disposed lower panels or plates 50a, 51a with the upper member 50 fitting into and spaced from the lower member 51 to provide an opening or space 53 between the laterally disposed panels 50a, 51a. The two channel members 50, 51 are rigidly held together in any suitable manner. The lower panel section 51a has a longitudinal slot 54 extending the length of the panel. The construction of the upper or first section 30 is identical to that of the lower section 31 and will therefore not be set forth in detail.

At the bale discharge end 15 of the elevator there is provided a pair of upright longitudinally extending panels 55, 56 fixed at their lower ends to the side walls 16, 17. The panels 55, 56 are flanged at their upper edge and are interconnected by means of a transverse plate or panel 57. Fixed to the outer surface of the panel 55 is a bracket 58 which supports at its outer end a reversing idler sprocket 59. The bracket 58 is provided with suitable slots for permitting take-up in a chain drive presently to be described. The panels 55, 56 also support a transverse sprocket shaft 60, the outer end of which has a chain sprocket 61 pinned thereto. Fixed to the transverse conveyor shaft 23 is a chain sprocket 62. Mounted over the sprockets 59, 61, 61 is a chain 63. The sprockets 61, 62 are of the same size and consequently the shafts 23, 60 will have the same rate of rotation. The shaft 60 supports a second sprocket 64 centrally between the panels 55, 56.

At the lower end of the lower guide section 31 is a pair of inwardly turned brackets 70, 71 supporting a transverse sprocket shaft 72. Fixed to the shaft 72 is a chain sprocket 73 positioned centrally relative to the brackets 70, 71. Also mounted on the transverse shaft 72 outwardly of the channel members 50, 51 is a pair of rotating wheels 74, 75 having radially extending bale-engaging fingers 76, 77 respectively. The wheels 74, 75 are provided with hubs, such as is shown at 78, to space the wheels transversely and outwardly of the guide section 31.

Mounted over and extending between the sprockets 64, 73 is o continuous chain 80 with an upper run 80a disposed above the guide sections 30, 31 and riding on the guide panel or plate 50a of the upwardly opening channel member 50, and a lower run 80b receiving backing support from the tranverse laterally disposed section 50a of the channel member 50. The links of the chain 80 are provided with longitudinally spaced and vertically extending lugs 81 and laterally extending lugs 82. The lugs 81, 82 are transversely spaced apart so as to ride on opposite sides of the sprockets 64, 73 and obviously not interfere with the sprocket teeth as they pass over the sprockets. The lugs 82 are disposed between the panel sections 50a, 50b and extend laterally beyond the edges defining the slot 54. The vertical lugs 81 depend through the slot 54 to contact the upper surface of the bales. Consequently the lower panel section 50a and its slot 54 serves as means on the guide preventing lateral and vertical displacement of the chain relative to the guide.

Adjacent the lower end of the guide section 31 is an idler sprocket 85 supported by brackets 86, 87 on the vertical wall portions of the inner channel member 50. Also at the upper end of the upper section 30 is an idler sprocket 88 bracketed, as at 89, to the section 30. The sprockets 85, 88 maintain the chain 80 between the vertical walls of the channel member 50.

The invention operates in the following manner. Upon bales being received in the lower end of the elevator, they will first contact the driven wheels 74, 75. The fingers 76, 77 will tend to bite into the bales and begin the movement of the bales on the lower or floor conveyor 20. Should the bales enter endwise, the wheels 74, 75 will tend to tumble the bales into a position lengthwise of the trough.

Following the bales entering into the trough, they will normally be driven upwardly by the conveyor 20. However, if for any reason they would tend to tumble down the trough, the guide sections 30, 31 and lugs 81 of chain run 80b will engage the bales and will drive the upper surface of the bales at substantially the same rate of movement as they are driven by the conveyor 20. It is for the purpose of driving the chain 80 at the same speed as the conveyor 20 that the sprockets 61, 62 are the same size as well as the sprockets 19 of the conveyor 20 and the sprocket 64. The power for operating the upper chains 80 is received from the power source 24 through the chains of the floor conveyor 20 and the chain 63. Since the forward drive section 31 projects forwardly of the support 32, the forward end of the support is clear to receive the bales. By having the drive connection between the chain 80 and the floor conveyor 20 at the upper end of the elevator, there is created a measure of safety since the direct driving connection is spaced from the location where men may be working. Also, by so placing the drive, it will not interfere or will not be contacted by the bales tumbling from, for example, a truck or wagon unloading the elevator hopper.

Since the sections 30, 31 are pivotally interconnected a degree of slack must be left in the lower run 80b of the chain to accommodate the bending or flexing between the guide sections. By the fact that the lower run will be held within the space 53 by means of the lateral lugs 82 extending beyond the opposite edges of the slot 54 the lower run will be held against both vertical and lateral sway regardless of the slack. The upper run will create no problem since it is confined between the sides of the V-shaped guide section 50 and also held in position by the sprockets 85, 88.

While only one form of the invention has been shown, it should be recognized that other forms and variations will occur to those skilled in the art. Also, while the guide and chain were shown in an overhead position, it should be recognized that guide and chain assemblies would be of value even if positioned to the sides or on the bottom of the material to be conveyed. Therefore, it should be understood that while the present form was shown and described in detail for the purpose of clearly and concisely illustrating the principles of the invention, it was not the intention to so limit or narrow the invention beyond the broad concept set forth in the appended claim.

What is claimed is:

In an elevator for handling bales including trough structure inclined at a relatively large angle from the horizontal and between a lower bale-receiving end to an upper bale-discharge end and advancing means movable lengthwise of the trough to move bales from the receiving end to the discharge end, a device preventing gravitational tumbling of the bales comprising: an elongated and substantially rigid bale guide supported on and above the trough structure at a height from the trough structure substantially the width of the bale, said bale guide including vertically spaced upper and lower laterally disposed plates, the lower of the plates having a longitudinal slot extending the length thereof; longitudinally spaced sprocket means mounted on opposite ends of the guide; a continuous chain mounted over the sprockets having an upper run disposed above the upper plate and a lower run disposed between the upper and lower plates, the links of the chain having vertically extending and laterally extending lugs thereon, the lower run of the chain having its vertical lugs depending through the longitudinal slot for contact with the bales and its laterally disposed lugs extending beyond the edges of the slot and between the upper and lower plates to prevent lateral and vertical sway of the lower run; and drive means effecting movement of the chain.

References Cited in the file of this patent

UNITED STATES PATENTS

| | | |
|---|---|---|
| 1,534,334 | Stutsman | Apr. 21, 1925 |
| 2,297,632 | Mosley | Sept. 29, 1942 |
| 2,443,947 | Brooks | June 22, 1948 |
| 2,561,069 | Peterson | July 17, 1951 |
| 2,647,616 | Lance | Aug. 4, 1953 |
| 2,788,117 | Harper | Apr. 9, 1957 |

FOREIGN PATENTS

| | | |
|---|---|---|
| 699,910 | Germany | Dec. 9, 1940 |